United States Patent
Abdel-Maksoud et al.

(10) Patent No.: US 7,052,339 B2
(45) Date of Patent: May 30, 2006

(54) PROPULSION SYSTEM FOR A FAST SEAGOING SHIP, ESPECIALLY A NAVAL SHIP

(75) Inventors: Moustafa Abdel-Maksoud, Berlin (DE); Wolfgang Rzadki, Glinde (DE); Karl-Otto Sadler, Hamburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/516,228

(22) PCT Filed: May 16, 2003

(86) PCT No.: PCT/DE03/01591

§ 371 (c)(1),
(2), (4) Date: Nov. 29, 2004

(87) PCT Pub. No.: WO03/101820

PCT Pub. Date: Dec. 11, 2003

(65) Prior Publication Data

US 2005/0215129 A1    Sep. 29, 2005

(30) Foreign Application Priority Data

May 29, 2002    (DE) ............................ 102 24 012

(51) Int. Cl.
*B63H 11/103* (2006.01)
(52) U.S. Cl. .................................. 440/47; 440/38
(58) Field of Classification Search ............ 440/38, 440/40–43, 47
See application file for complete search history.

(56) References Cited

U.S. PATENT DOCUMENTS 3,073,277 A * 1/1963 Lee .............................. 440/43
3,185,124 A * 5/1965 Spence ........................ 440/43
3,250,475 A * 5/1966 Smith ...................... 239/265.27
3,342,032 A    9/1967 Cox et al.
3,943,876 A * 3/1976 Kiekhaefer ................. 440/43
4,643,685 A * 2/1987 Nishida ....................... 440/42
4,979,917 A    12/1990 Haynes
5,588,886 A    12/1996 Davis
5,863,229 A * 1/1999 Matte .......................... 440/47

FOREIGN PATENT DOCUMENTS

FR    1 563 913 A    4/1969
JP    402144293    *    6/1990
JP    2001225794    *    8/2001

OTHER PUBLICATIONS

Goossens, L., "A New Design Lay-Out with Alternative Propulsion on High Speed Displacement Ships", International Marine Design Conference and Summer Meeting of the German Society of Naval Arhchitects, XX, XX, vol. 1, No. 1, 1994, pp. 111-124, XP002109514.

(Continued)

Primary Examiner—Sherman Basinger

(57) ABSTRACT

The invention relates to a propulsion system for a fast seagoing ship, especially a naval ship, which comprises a propulsion system driven by at least one water jet produced by a pump assembly with an outlet nozzle for water, and a propeller jet produced by at least one propeller. The water jet carries along gases that are introduced downstream of the pump assembly, especially exhaust gases of at least one drive device which especially comprises a power generation device and a generator. The water jet is generated in at least one water jet drive by means of a pump that is, e.g., driven by an electric motor and whose drive power is generated by e.g. a generator assembly.

10 Claims, 5 Drawing Sheets

OTHER PUBLICATIONS

Gunter Guseck, "Kommt die Fregatte der Zukunft aus Dautschland?", Marine Forum, No. 76, Sep. 2001, pp. 1, 6, 8, 10, 12, 14, 16-20 & 56.

Rolls-Royce, "Rolls-Royce- the force in marine solutions", Internet pages of Rolls-Royce, pp. 1-36.

* cited by examiner

PROPULSION SYSTEM FOR A FAST SEAGOING SHIP, ESPECIALLY A NAVAL SHIP

CROSS REFERENCE TO RELATED APPLICATIONS

This application is the US National Stage of International Application No. PCT/DE03/01591, filed May 16, 2003 and claims the benefit thereof. The International Application claims the benefits of German application No. 10224012.4 filed May 29, 2002, both of the applications are incorporated by reference herein in their entirety.

FIELD OF INVENTION

The invention relates to a propulsion system for a fast seagoing ship, especially a naval ship having a propulsion system driven by at least one water jet produced in a pump assembly with an outlet nozzle and preferably a propeller jet produced by at least one propeller.

BACKGROUND OF INVENTION

The proposal of fast seagoing naval ships with a propulsion system driven by water jets and propellers is known, e.g. in the article by Günter Guseck "Kommt die Fregatte der Zukunft aus Deutschland?" (Will the frigate of the future come from Germany?) in the magazine Marineforum, no. 76, September 2001, page 8.

However the proposals made to date, e.g. also on the internet—information from the Rolls Royce company—do not indicate how in particular low-emission or emission-free fast seagoing ships, which are propelled by a water jet, should be configured. In particular a flow guide on the bottom of such ships is not addressed in the known proposals.

SUMMARY OF INVENTION

The object of the invention is to specify a propulsion system for a fast seagoing ship, possibly a passenger ship or a RoPax ferry and especially a naval ship, which unlike the systems known to date can prevent an exhaust flag and significantly impedes or renders impossible location of the ship using known sensors, e.g. infrared sensors and optical sensors.

The above-mentioned object is achieved in that the water jet carries along gases that are introduced downstream of the pump assembly, especially exhaust gases of at least one drive device, which especially comprises a power generation device and a generator. The water jet is generated in at least one water jet drive by means of a pump that is for example driven by an electric motor, or directly via a diesel engine or a gas turbine, the drive power of which is generated by a generator assembly for example.

The inventive solution allows the direct introduction of exhaust gas into the water, which is particularly advantageous. The known exhaust flag does not occur and cannot therefore be located either by infrared sensor or optically. Advantageously this also applies during operation under full load conditions, i.e. at maximum speed. The typical noise of an exhaust stack is also absent. The exhaust gases can thereby originate from a diesel unit, a gas turbine unit, a steam turbine or a combined drive unit for driving the water jet propulsion units.

In one embodiment of the invention the gases are fed to the water jet in a low-pressure field in the region of the outlet of the water jet from a pump assembly with a pump. Therefore advantageously no auxiliary power has to be used to expel the exhaust gas and a corresponding assembly is not required. It is especially advantageous that with a generator assembly comprising a gas turbine and a generator the efficiency of the gas turbine is not impaired by back pressure. A somewhat higher rather than a lower level of efficiency thus results compared with when the exhaust gas flow from the gas turbine is emitted freely into the atmosphere.

In a further embodiment of the invention the water jet emits its water at a downward angle toward the bottom of the ship. The exhaust gases of any power generation unit, e.g. a steam turbine unit or a diesel reformer of a fuel cell unit can thus be directed into the water. This results advantageously in less friction between the water jet and the bottom of the ship with good distribution of the gases also carried along in the water.

In a development of the invention gas bubbles are advantageously formed by the water jet and the gas bubbles are for the most part directed under the bottom of the ship. Advantageously this means that the gas bubbles are guided to behind the stern of the ship where they dissolve in the eddying outward flow, thereby preventing location of the exhaust gas. Passengers for example on the rear deck of a megayacht cannot discern the exhaust gases.

There is also provision for the gas bubbles to occur to some extent at the sides of the ship. This results in an advantageous reduction of the friction at the sides of the ship too.

The embodiment of the propulsion system advantageously provides for two propeller propulsion units, preferably electric rudder propellers, in addition to the water jet propulsion units and for the water jet and gas bubbles to be directed below the bottom of the ship essentially in the center between the propellers. Thus despite the arrangement of two totally different propulsion components, there is a good flow to the elements of the propulsion components arranged at the rear. It is thereby advantageous for the propellers, possibly the electric rudder propellers, to be set for forward drive in a gas bubble/water mixture. This results in a favorable overall level of efficiency in the propulsion system.

The water/gas mixture of the propulsion system is advantageously produced in the central section of the ship and directed from there to the rear essentially along the bottom of the ship. It is therefore advantageously possible to mix the gas bubbles with the water in the inventive manner over a relatively long distance. The advantage also results that the individual propulsion components are spatially relatively far away from each other. This increases the stability of the propulsion system in the event of a strike, e.g. in the case of naval ships.

Provision is also advantageously made for the water/gas mixture to be configured as a multijet helical flow, rotating in each instance per se and formed by the rising gas bubbles. Particularly good distribution of the gas can thus advantageously be achieved in the wake of the ship.

In a different embodiment of the invention the water/gas mixture is configured as a multijet fan flow. This embodiment results in a particularly low-friction stern flow and allows pump assemblies, which only project a short distance beyond the bottom of the ship. This design is therefore particularly advantageous for relatively small units, such as speedboats or minesweepers but also for megayachts.

In one advantageous embodiment of the invention a water jet production unit is provided for the propulsion system, which has a chamber, preferably a coaxial exhaust nozzle segment (KADS) for the supply of gas, especially exhaust gas, to the water jet, with the gas advantageously being fed in a low-pressure region of the chamber. Thus the gas, especially the exhaust gas, can be introduced without an auxiliary assembly.

Provision is thereby particularly advantageously made for the outlet nozzle of the pump assembly and its housing not to be configured as round but in particular as oval. In this way it is possible advantageously to achieve a particularly favorable jet configuration of the gas/water mixture below the bottom of the ship. The outlet nozzles can thereby also be in the form of flat rectangles. The advantageous effect of directing the gas/water mixture below the bottom of the ship is maintained; the projection of the housing beyond the bottom of the ship is further reduced.

It is also advantageous for the outlet nozzle to have elements for adjusting the cross-section of the jet for the water jet within the coaxial exhaust nozzle segment (KADS), e.g. a ring diaphragm or baffles. In this way both the speed and direction of the ship can be adjusted and regulated.

The water jet production unit is advantageously arranged in a region incorporated upward inside the ship. This results in the bottom of the ship being configured in a manner that is particularly favorable to the flow with only a slight increase in resistance due to the housing of the water jet production unit.

The invention is described in more detail below with reference to drawings, from which further details essential to the invention will emerge, as they will from the dependent claims.

BRIEF DESCRIPTION OF THE DRAWINGS

The Figures show the following in detail.

DETAILED DESCRIPTION OF INVENTION

Figure 1:
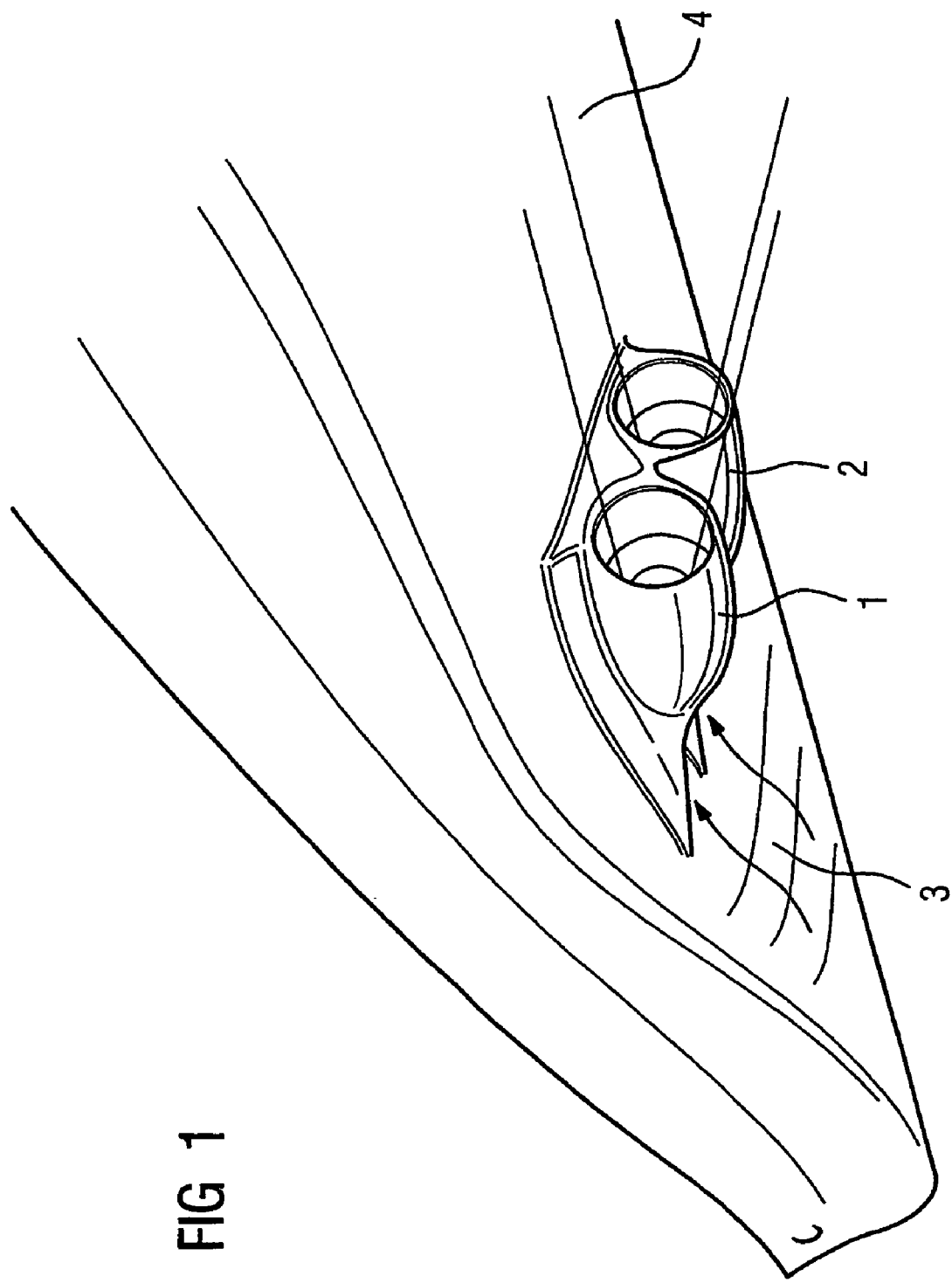
FIG. 1 a grid topology of two water jet housings and the shape of the lower part of the bottom in the region of the water jet gondolas.

In FIG. 1 the housings of the water jets are designated with reference characters 1 and 2 and these are located in an incorporated section 3 of the lower bottom 4 of the ship. This position results in good inflow and outflow conditions for the water jets 1, 2, which are advantageously adjusted in respect of their distance from the lower bottom of the ship 4 in the rise of the bottom of the ship.

Figure 2:
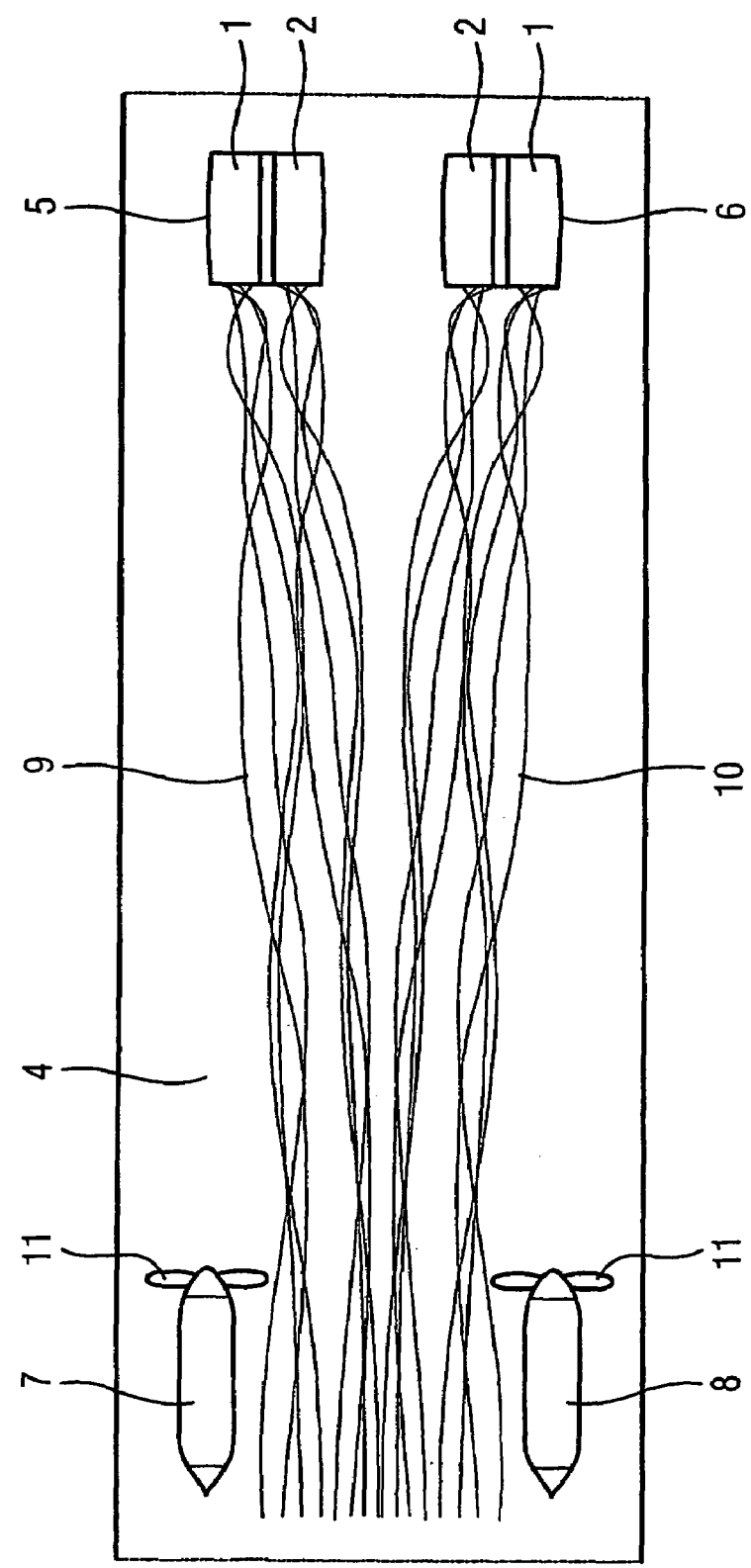
FIG. 2 the flow line pattern between the water jets and the rudder propellers.

In FIG. 2 reference characters 5 and 6 designate the water jet housing pairs and 7 and 8 the housings of the electric rudder propellers. As shown, the flow lines 9, 10 run out of the water jet housings 5, 6 in a constricted manner in the region of the rudder propellers 7, 8, when the feed rate (speed and torque) of the electric rudder propellers 7, 8 is adjusted accordingly. FIG. 2 is a computer simulation; in fact a certain fanning of the flow lines can result at different speeds. The basic principle that the main flow of the water jet runs through the inner region of the rudder propellers 7, 8 is however maintained.

Figure 3:
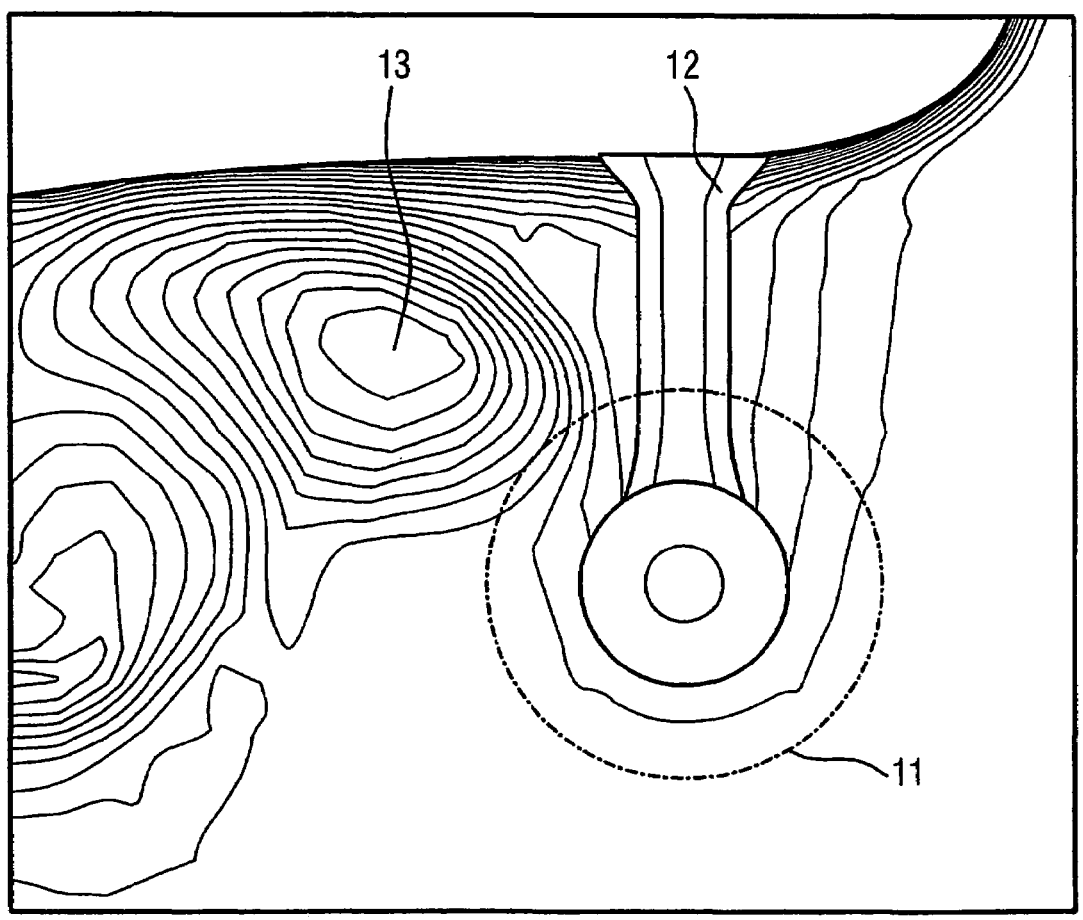
FIG. 3 the wake fields in the plane of the propellers of the rudder propellers.

FIG. 3 shows the flow distribution in the plane of the propeller 11 of the electric rudder propellers 12. A closed flow field 13 essentially results with the consequence that the mass of the gas bubbles exits in the wake of the ship and, with the eddying taking place there, is of a size that is no longer detectable.

Figure 4:
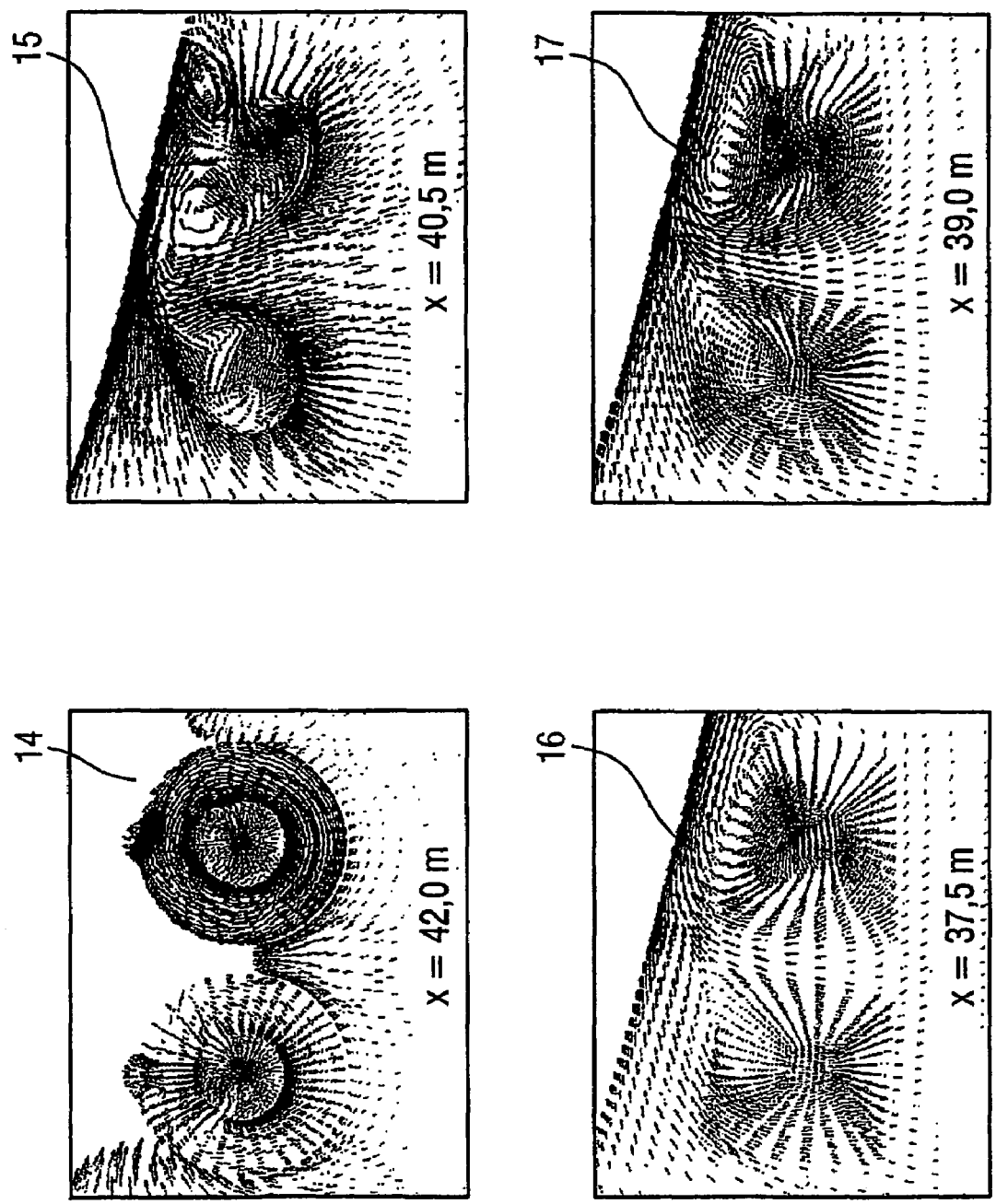
FIG. 4 flow vectors in four cross-sectional planes of the water jets and
FIG. 5 the outline of a water jet with exhaust gas added in the coaxial exhaust nozzle segment (KADS).

FIG. 4 shows how the outward flow of the water jets behaves. In the plane according to 14 it is still closed but as the distance increases, it fans out as shown by 15, 17 and 16. The increasing distance from the outlet on the water jet housings is shown by the decreasing X. The influence of the rising air bubbles causes clearly identifiable distortion of the flow field.

Figure 5:
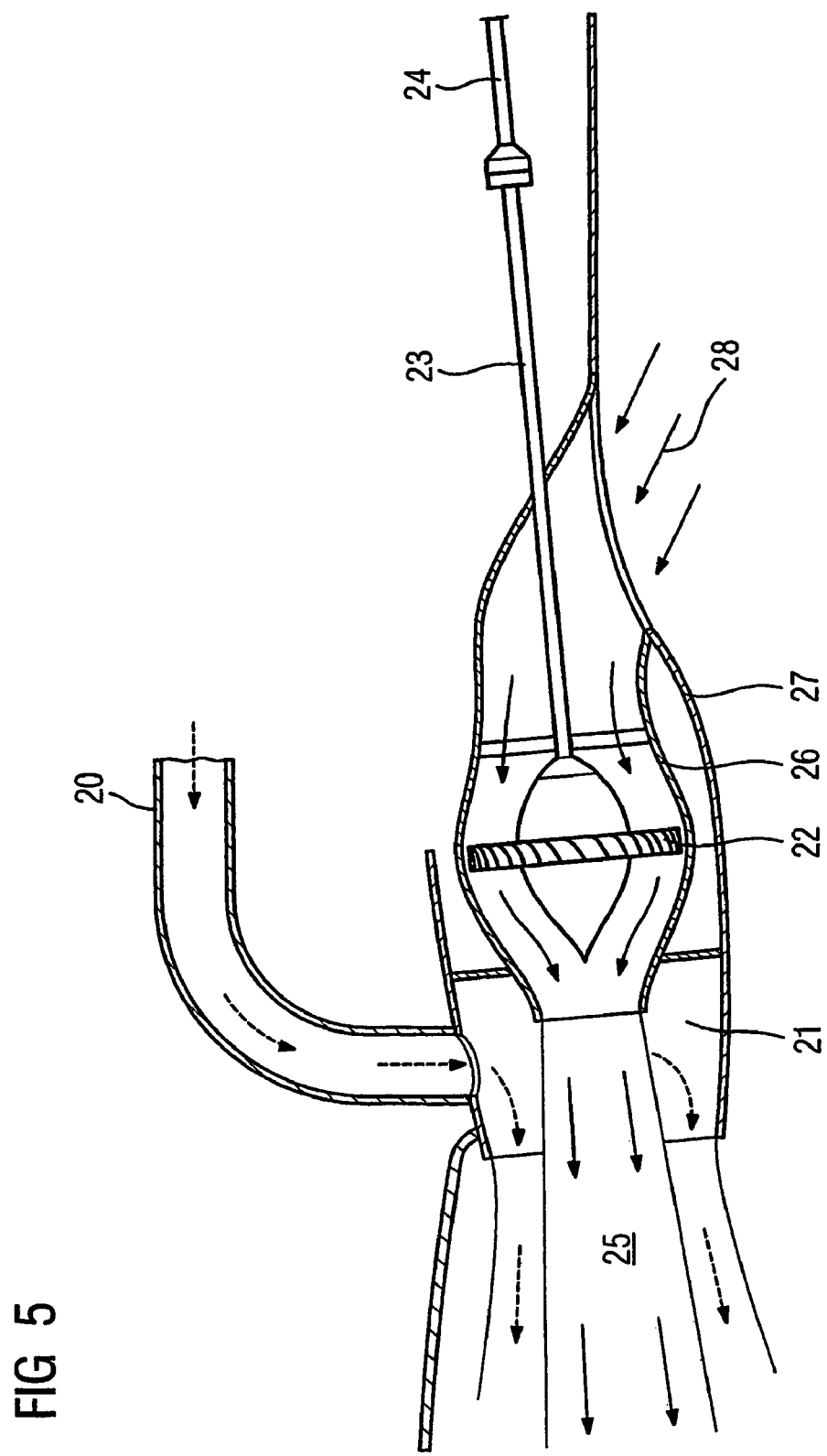

In FIG. 5 reference character 22 shows the impeller at the end of the pump shaft 23. This is connected via the shaft 24 to a motor, which may be an electric motor or even a diesel motor or a gas turbine. The motor is not shown. The length of the shaft 24 depends on its design. For it to be as short as possible, a motor with smaller dimensions is advantageous, possibly an electric motor with high-temperature superconducting coils.

The water jet is marked as 25. It exits from the mixing chamber bringing with it the exhaust gases fed by the exhaust pipe 20. The mixing chamber 21 is advantageously configured as a coaxial exhaust nozzle segment (KADS). This coaxial exhaust nozzle segment (KADS) advantageously forms the rear of the gondola housing 27, in which the pump housing 26 is located. The inward water flow is marked as 24.

A further aspect of the invention is to provide a propulsion system for a fast seagoing ship, especially a naval ship, with a propulsion system driven by at least one water jet produced in a pump assembly with an outlet nozzle for the water and a propeller jet produced by at least one propeller, with the water jet (25) carrying along gases that are introduced downstream of the pump assembly (22, 26), especially exhaust gases of at least one drive device, which especially comprises a power generation device and a generator. The water jet (25) is generated in at least one water jet drive by means of a pump (22) that is for example driven by an electric motor, the drive power of which is generated for example by a generator assembly, wherein it has a water jet production unit having a chamber (21) for the supply of gas, in particular exhaust gas, to the water jet (25), with the gas being supplied in a low-pressure region of the chamber (21).

The invention claimed is:
1. A propulsion system for a fast seagoing ship, comprising:
a propulsion unit driven by at least one water jet produced by a pump assembly with an outlet nozzle for the water and driven by an impeller, wherein
the water jet carries along gases introduced downstream of the pump assembly, wherein
the water jet is generated in at least one water jet drive by a pump, wherein
the at least one water jet drive has a water jet production unit having a chamber for the supply of gas to the water jet, the gas supplied in a low-pressure region of the chamber; and further comprising
a propeller mounted aft of the propulsion unit effective for dispersing the gas carried along by the water jet in a surrounding volume of water.

2. The propulsion system according to claim 1, wherein the water jet production unit is adapted to be attached in a recess of the bottom of the ship.

3. A propulsion system for watercraft, comprising:
left and right propellers mounted on respective left and right portions of a watercraft bottom;
a water jet drive mounted on the watercraft bottom forward of the propellers for directing a water jet below the bottom of the watercraft and between the propellers when the water craft is in forward motion;
the water jet drive comprising a water pump with a water outlet nozzle and an exhaust nozzle generally surrounding the water outlet nozzle for mixing exhaust gas into the water jet, the propellers and the water jet drive cooperatively effective to disperse the exhaust gas in a surrounding volume of water.

4. The propulsion system of claim 3 wherein the propellers comprise rudder propellers for steering the watercraft.

5. The propulsion system of claim 4 wherein a plurality of water jet drives are mounted on the watercraft bottom forward of the propellers, and the water jet drives produce a multi-jet helical flow of mixed propulsion water and gas streams.

6. The propulsion system of claim 3 wherein the water jet drive is mounted on a central section of the water craft bottom, and the propellers are mounted on a rear portion of the watercraft bottom.

7. The propulsion system of claim 3 wherein the water jet drive is mounted in a recess in the watercraft bottom.

8. The propulsion system of claim 3 wherein the exhaust gas mixed into the water jet is directed effectively for reducing a fluid friction on the watercraft bottom when the watercraft is in motion.

9. A watercraft comprising the propulsion system of claim 3.

10. A water craft, comprising:
a hull having a bottom;
left and right rudder propellers mounted on respective left and right portions of the watercraft bottom;
a plurality of water jet drives on the hull bottom forward of the propellers for directing a multi-jet helical flow of mixed propulsion water and gas streams below the hull bottom and between the propellers when the water craft is in forward motion; and
each of the water jet drives comprises a water pump with a water outlet nozzle and a gas nozzle generally surrounding the water outlet nozzle for mixing a gas into the water jet effective to disperse the gas in the water jet and to reduce a fluid friction on the water craft bottom when the water craft is in forward motion.

* * * * *